United States Patent
Helgason

(10) Patent No.: US 11,946,619 B2
(45) Date of Patent: Apr. 2, 2024

(54) LOCATION LIGHTING FOR USE IN OFFGRID RAILROAD

(71) Applicant: Electrical Solutions of Regina, Inc., Regina (CA)

(72) Inventor: Brad Helgason, Regina (CA)

(73) Assignee: ELECTRICAL SOLUTIONS OF REGINA, INC., Regina (CA)

( * ) Notice: Subject to any disclaimer, the term of this patent is extended or adjusted under 35 U.S.C. 154(b) by 0 days.

(21) Appl. No.: 17/984,852

(22) Filed: Nov. 10, 2022

(65) Prior Publication Data
US 2024/0044464 A1    Feb. 8, 2024

(30) Foreign Application Priority Data
Aug. 6, 2022  (CA) .................................. CA 3169860

(51) Int. Cl.
F21S 9/03    (2006.01)
F21S 8/08    (2006.01)
F21Y 115/10  (2016.01)

(52) U.S. Cl.
CPC .............. *F21S 9/035* (2013.01); *F21S 8/085* (2013.01); *F21Y 2115/10* (2016.08)

(58) Field of Classification Search
CPC .................................. F21S 9/035; F21S 8/085
See application file for complete search history.

(56) References Cited

U.S. PATENT DOCUMENTS

| | | | | |
|---|---|---|---|---|
| 5,588,630 A * | 12/1996 | Chen-Chao | ............. | F16C 11/10 248/514 |
| 5,878,762 A * | 3/1999 | Huang | .................... | A45B 23/00 248/122.1 |
| 6,089,246 A * | 7/2000 | Barnes | .................... | F16M 11/10 135/117 |
| 6,709,172 B2 * | 3/2004 | Brown | .................... | H04N 7/181 348/E7.086 |
| 7,465,108 B2 * | 12/2008 | Brown | ............. | G08B 13/19632 348/E7.086 |
| 7,989,979 B2 * | 8/2011 | Burgess | ................. | B60Q 1/245 307/112 |
| 9,968,167 B2 * | 5/2018 | Volin | ....................... | F16B 7/182 |
| 10,159,238 B2 * | 12/2018 | Cumpian, Jr. | ........ | B60Q 1/2657 |
| 10,563,827 B2 * | 2/2020 | Jadidzadeh | ............. | H02S 40/38 |
| 10,968,895 B1 * | 4/2021 | Groleau | .................... | E04H 5/02 |
| 2010/0232148 A1 * | 9/2010 | Sharpley | .................... | F21L 4/08 362/183 |
| 2019/0103022 A1 * | 4/2019 | Kelly | ................... | G08G 1/0955 |

* cited by examiner

*Primary Examiner* — Arman B Fallahkhair
(74) *Attorney, Agent, or Firm* — BrownWinick Law Firm; Christopher A. Proskey

(57) ABSTRACT

An off-grid location lighting fixture is provided. The off-grid location lighting fixture comprises a base and a pole mounted to the base at a bottom end portion thereof. A solar panel is mounted to the pole at a top end portion thereof. An LED light is mounted to the pole. A battery is connected to the solar panel and the LED light. The battery is adapted for storing electrical energy received from the solar panel and for providing the same to the LED light. Control circuitry is connected to the solar panel, the LED light and the battery to control storage of the electrical energy and provision of the same to the LED light.

16 Claims, 5 Drawing Sheets

LOCATION LIGHTING FOR USE IN OFFGRID RAILROAD

FIELD OF ENDEAVOR

The present disclosure relates to location lighting in railroad applications, and more particularly to an off-grid location lighting fixture for railroad applications.

BACKGROUND

Incoming regulations require railroads to have lighting in place at each switch location along their railroad lines. However, the installation of lighting fixtures at each switch location with the associated wiring for provision of electrical power as a retro-fit raises various issues resulting in a difficult, time consuming, and expensive process.

For example, in tightly packed railyards the installation is complicated by having to avoid other installations such as, for example, fibre-optic right-of-way installations, while in remote locations the provision of electrical power requires the installation of wiring over large distances.

It is desirable to provide an off-grid location lighting fixture for railroad applications.

It is also desirable to provide an off-grid location lighting fixture for railroad applications that is easy to install.

It is also desirable to provide an off-grid location lighting fixture for railroad applications that can be installed absent significant site disturbance.

SUMMARY

Accordingly, one object of the present disclosure is to provide an off-grid location lighting fixture for railroad applications.

Another object of the present disclosure is to provide an off-grid location lighting fixture for railroad applications that is easy to install.

Another object of the present disclosure is to provide an off-grid location lighting fixture for railroad applications that can be installed absent significant site disturbance.

According to one aspect of one or more embodiments, there is provided an off-grid location lighting fixture. The off-grid location lighting fixture comprises a base and a pole mounted to the base at a bottom end portion thereof. A solar panel is mounted to the pole at a top end portion thereof. An LED light is mounted to the pole. A battery is connected to the solar panel and the LED light. The battery is adapted for storing electrical energy received from the solar panel and for providing the same to the LED light. Control circuitry is connected to the solar panel, the LED light, and the battery. The electrical circuitry controls storage of the electrical energy and provision of the same to the LED light.

In other embodiments the off-grid location lighting fixture comprises a base mounted to a screw pile and a pole mounted to the base at a bottom end portion thereof. A solar panel is mounted to the pole at a top end portion thereof. An LED light is mounted to the pole with an arm interposed therebetween. A battery is connected to the solar panel and the LED light. The battery is adapted for storing electrical energy received from the solar panel and for providing the same to the LED light. Control circuitry is connected to the solar panel, the LED light, and the battery. The electrical circuitry controls storage of the electrical energy and provision of the same to the LED light.

In further embodiments the off-grid location lighting fixture comprises a base and a pole mounted to the base at a bottom end portion thereof. The pole is mounted to the base such that the same is pivotally movable between a first position with the pole being oriented substantially horizontal and a second position with the pole being oriented substantially vertical. A solar panel is mounted to the pole at a top end portion thereof. An LED light is mounted to the pole. A battery is connected to the solar panel and the LED light. The battery is adapted for storing electrical energy received from the solar panel and for providing the same to the LED light. Control circuitry is connected to the solar panel, the LED light, and the battery. The electrical circuitry controls storage of the electrical energy and provision of the same to the LED light.

The pole might further include a handle, or a powered winch apparatus or the like, to permit simplified raising and lowered of the pole through its pivotal range of movement. Embodiments with or without such a handle or winch apparatus are all contemplated within the scope hereof.

The advantage of one or more embodiments is that it provides an off-grid location lighting fixture for railroad applications.

A further advantage of one or more embodiments is that it provides an off-grid location lighting fixture for railroad applications that is easy to install.

A further advantage of one or more embodiments is that it provides an off-grid location lighting fixture for railroad applications that can be installed absent significant site disturbance.

BRIEF DESCRIPTION OF THE DRAWINGS

One or more embodiments of the present disclosure is described below with reference to the accompanying drawings, in which.

DETAILED DESCRIPTION

Figure 1:
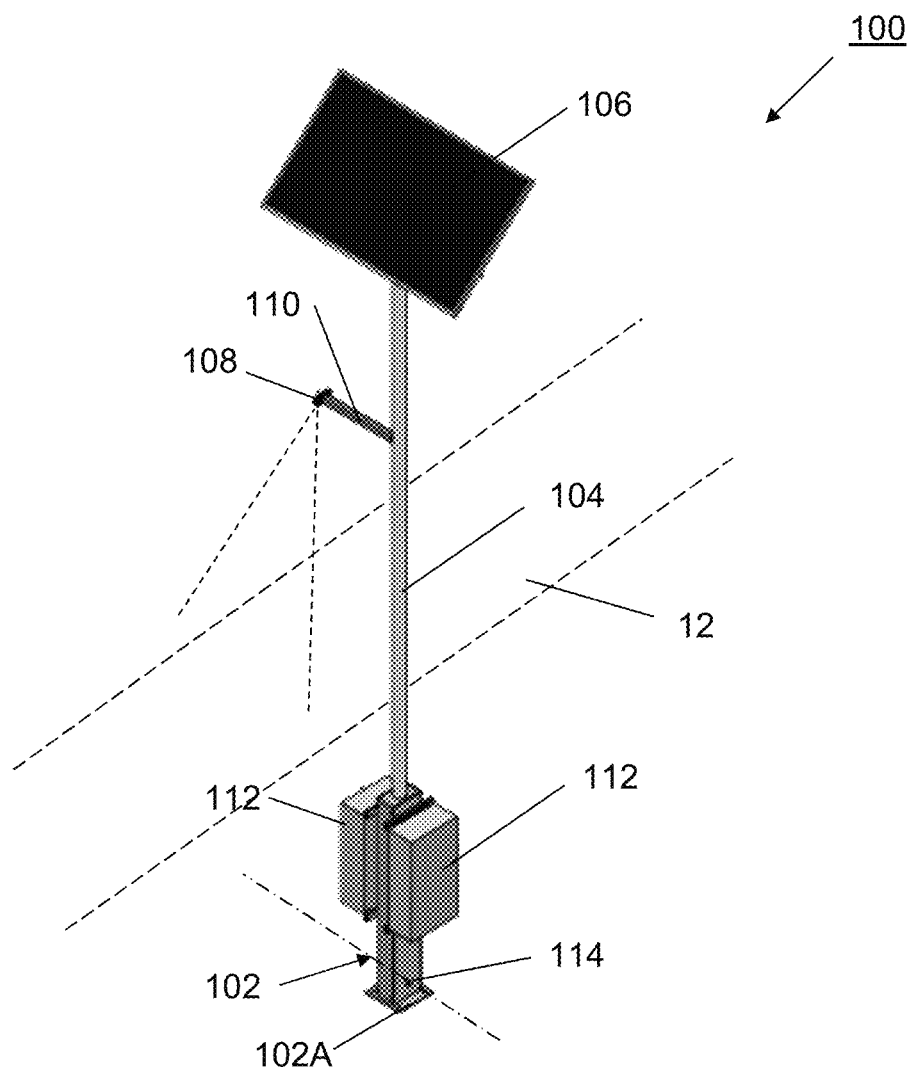
FIGS. 1 and 2 are simplified block diagrams illustrating in perspective views, an off-grid location lighting fixture, in accordance with one or more embodiments, the figures showing the lighting fixture being in operating position and in a position during installation and maintenance, respectively.

Unless defined otherwise, all technical and scientific terms used herein have the same meaning as commonly understood by one of ordinary skill in the art. Although any methods and materials similar or equivalent to those described herein can be used in the practice or testing various embodiments, the preferred methods and materials are now described.

While the description of the preferred embodiments hereinbelow is with reference to an off-grid location lighting fixture for railroad applications, it will become evident to those skilled in the art that the embodiments are not limited thereto, but are also adaptable for employing the off-grid location lighting fixture for various other applications such as, for example, illuminating road intersections, industrial yards, and parking lots.

Referring to FIGS. 1 to 5 an off-grid location lighting fixture 100 according to a preferred embodiment is provided. The off-grid location lighting fixture 100 comprises base 102 having a bottom portion of pole 104 mounted thereto. Preferably, the base 102 is adapted to be placed adjacent to a railway envelope 12 with minimum site disturbance, as will be described hereinbelow. Solar panel 106 is mounted to a top end portion of the pole 104. LED Light 108, preferably, mounted to an upper portion of the pole 104 via arm 110, is adapted to light an area at a predetermined location on ground adjacent to the light fixture 100 such as, for example, a section of a railway line 12, as indicated by the dashed lines in FIG. 1. Electrical boxes 112 are mounted, for example, to the base 102 for providing a weather-proof enclosure for one or more batteries and control circuitry contained therein. It is noted that, while two electrical boxes 112 are shown in the Figures, the embodiments are not limited thereto, but only one or more than two electrical boxes may be employed. The battery is connected to the solar panel 106 and the LED light 106 via electrical wiring which is, preferably, disposed inside the pole 104 and the arm 110. The battery stores the electrical energy received from the solar panel 106 during daytime and provides the same to the LED light 108 during nighttime. The control circuitry is connected to the solar panel 106, the LED light 108, and the battery. The control circuitry controls the storage of the electrical energy and the provision of the same to the LED light 108. Preferably, the solar panel 106, the LED light 108, the battery, and the control circuitry are adapted such that the lighting fixture 100 is operable as a self-contained unit absent any service connections.

Figure 2:
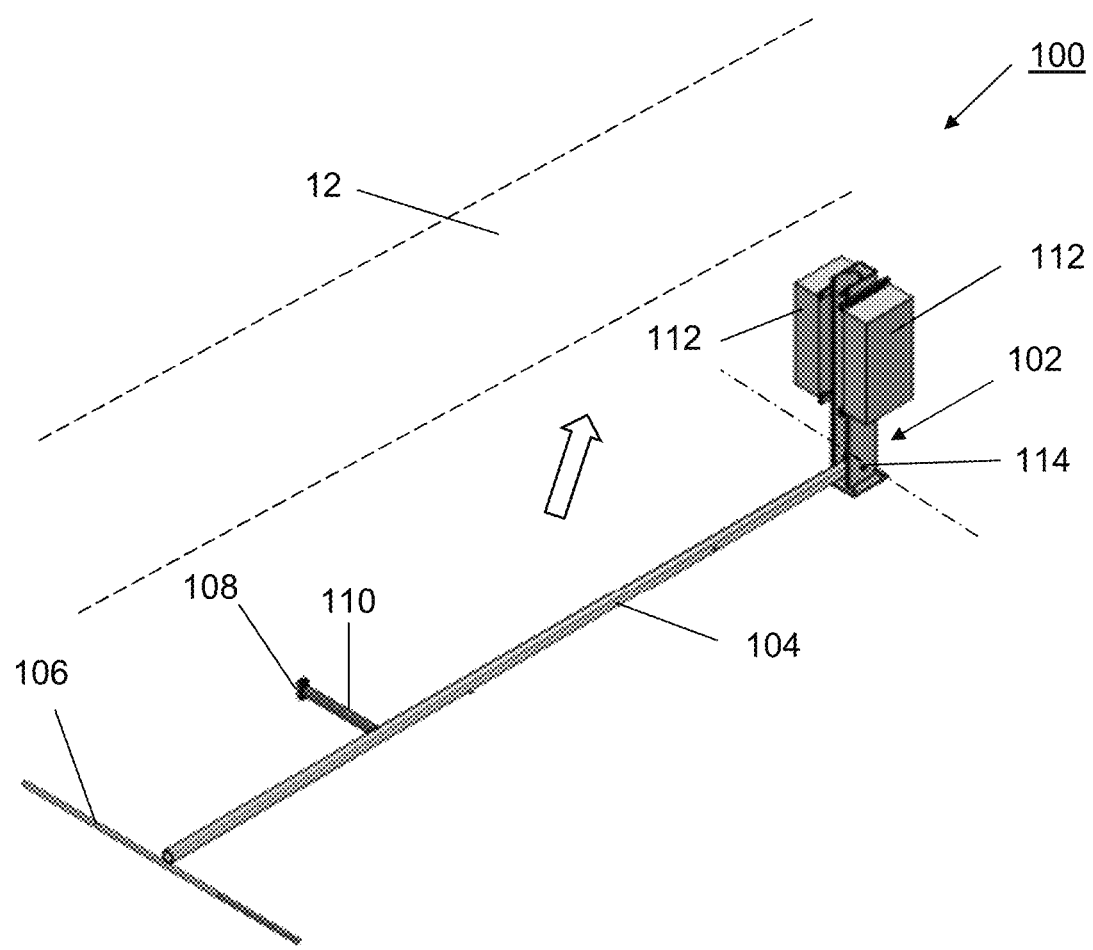
Figure 3:
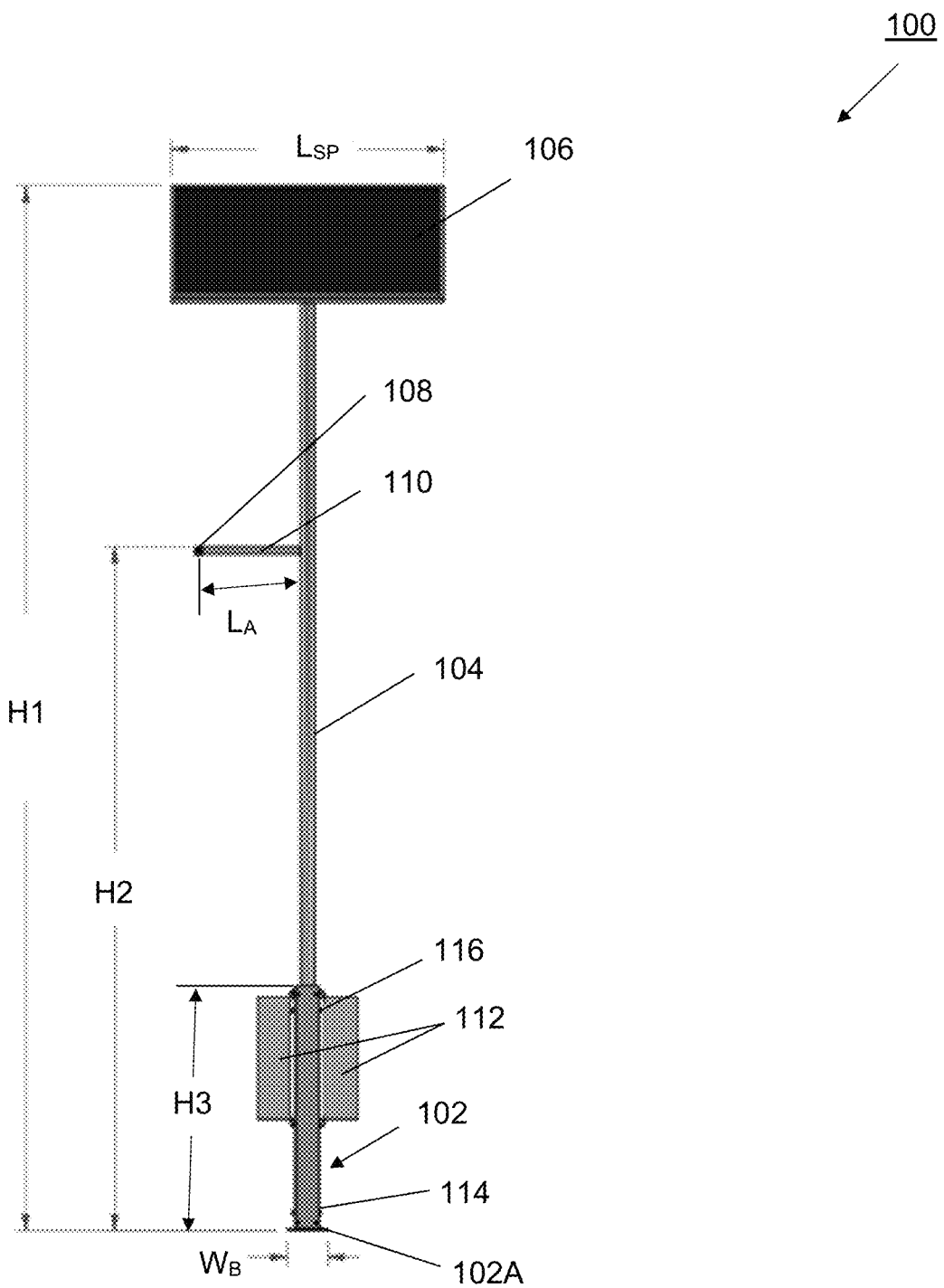
FIGS. 3 and 4 are simplified block diagrams illustrating in a front view and a side view, respectively, the off-grid location lighting fixture, in accordance with one or more embodiments; and, FIG. 5 is a simplified block diagram illustrating in a perspective view a base of the off-grid location lighting fixture, in accordance with one or more embodiments.

Preferably, the pole 104 is mounted to the base 102 such that the same is pivotally movable about pivot 114 between a first position with the pole 104 being oriented substantially horizontal and a second position with the pole 104 being oriented substantially vertical, as indicated by the block arrow in FIG. 2. The pivotal movement of the pole 104 with respect to the base 102 substantially facilitates installation and maintenance of the lighting fixture 100 by enabling work on the solar panel 106 and the LED light 108 on the ground, thus obviating work at height.

Further preferably, the lighting fixture 100 is adapted such that the LED light 108 illuminates an area of the railway 12 adjacent to the lighting fixture 100 in the direction of the pivotal axis 114, as illustrated in FIGS. 1 and 2, thus enabling placing of the lighting fixture 100 such that in the horizontal position the pole 104 is oriented substantially parallel to the railway track 12 which substantially facilitates installation and maintenance of the lighting fixture 100 without substantially disturbing railway traffic.

Figure 4:
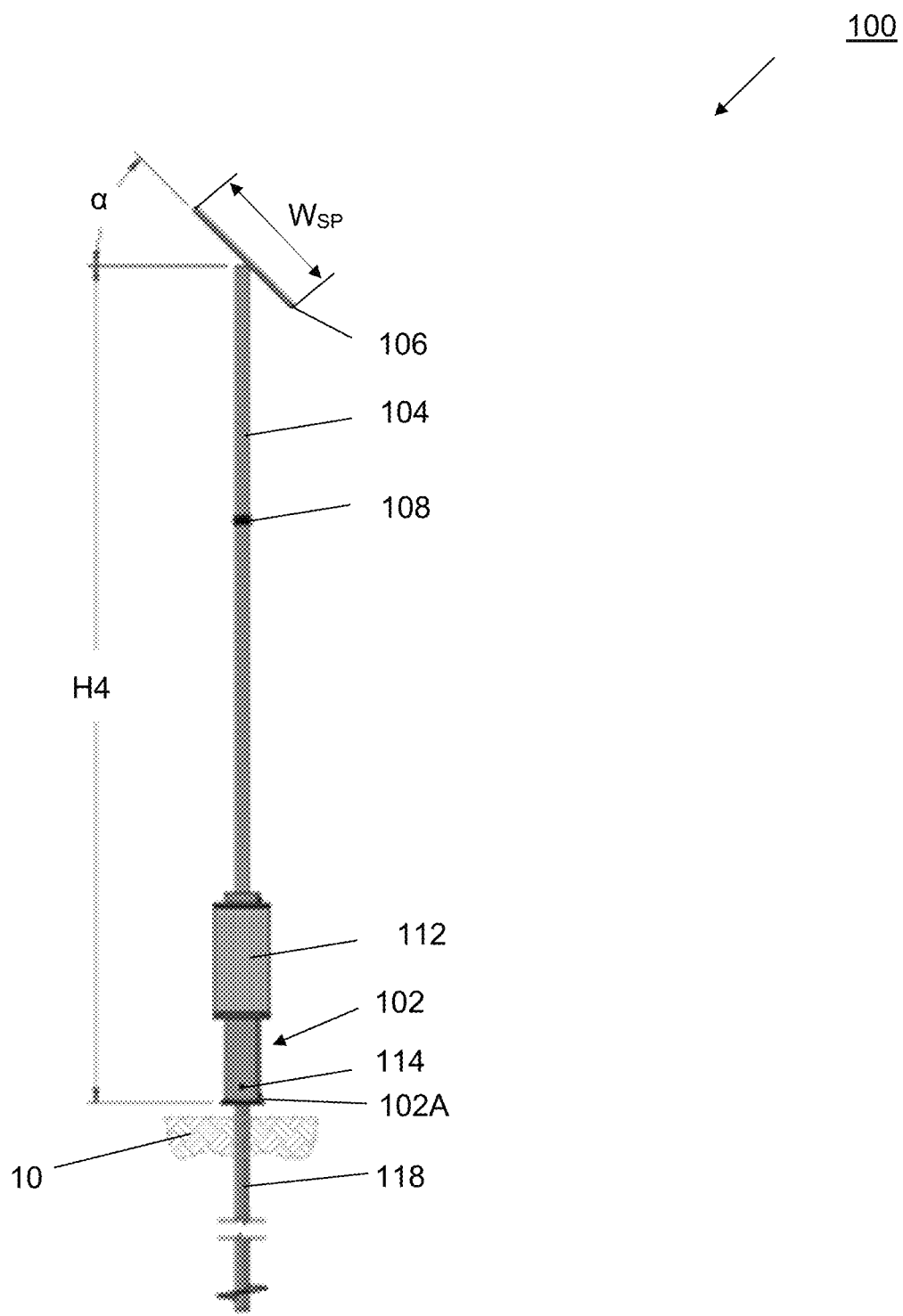
Figure 5:
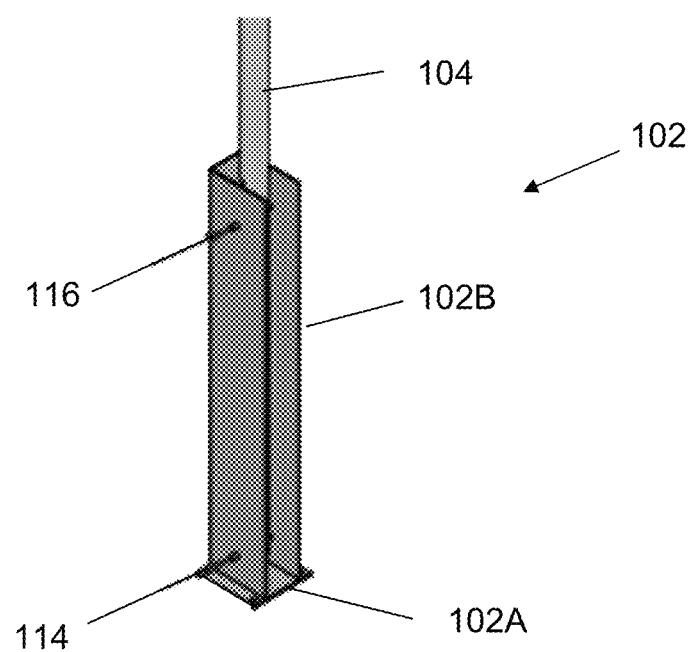

Further preferably, the base 102 is adapted for being mounted to a screw pile 118, as illustrated in FIG. 4, thus enabling easy installation without significant site disturbance by simply drilling the screw pile 118 into ground 10 and mounting base plate 102A thereto. Alternatively, the base plate 102A may be mounted to a foundation.

In an example implementation for providing location lighting for railway switches, the lighting fixture 100 comprises a pole 104 made of commercially available aluminum tubing having a length H4 of approximately 20' and a diameter of 3". The base 102 comprises a flat 10" by 10" ($W_B$) base plate 102A made of aluminum having welded thereto vertical base extension 102B, made of a commercially available U-shaped aluminum profile having length H3 of approximately 58" and a 6" by 10" cross section. The bottom portion of the pole 104 is accommodated inside the base extension 102B and secured thereto using pins or bolts 114 and 116 accommodated in respective apertures disposed in the pole 104 and the base extension 102B. Using pins or bolts 114 and 116 enables pivotally movable mounting of the pole 104 to the base extension 102B about bolt or pin 114. For example, during installation the pole 104 is first mounted to the base extension 102B via bolt or pin 114 having a substantially horizontal orientation and then erected into the vertical position and secured via bolt or pin 116. The base plate 102A is adapted for being mounted to a top of a commercially available screw pile 118 using, for example, screw fasteners.

Commercially available LED light 108 is mounted to the pole 104 via arm 110 made of commercially available 2" by 2" aluminum tubing having a length $L_A$ of 2' at height H2 of approximately 14' above ground.

Commercially available solar panel 106 having length $L_{sp}$ of approximately 5.5' and width $W_{sp}$ of 4' is mounted to the top of the pole 104 at angle a of approximately 45° to the horizontal, as illustrated in FIG. 4, giving the lighting fixture 100 a total height H1 of approximately 21.5'. The solar panel 106 is mounted to the pole 104 using conventional fasteners, preferably, such that during installation the solar panel can be rotated with respect to the pole 104 in order for the solar panel 106 to be oriented such that capture of sunlight is maximized.

As is evident to one skilled in the art, the lighting fixture 100 may be provided having various dimensions and can be made of different materials such as, for example, steel or composite materials, depending on design preferences.

The LED light 108, the solar panel 106 and the battery or batteries are chosen such that the LED light 108 provides sufficient lighting while the solar panel 106 and the batteries provide sufficient electrical power for a sufficient length of time.

The control circuitry comprises, for example, a processor for controlling the capture and provision of electrical power. The provision of electrical power to the LED light 108 can be controlled in different ways. For example, using a timer electrical energy is provided between predetermined hours of the day. Alternatively, a light sensor is employed to provide a signal when the ambient light is below a predetermined threshold. Further alternatively, a motion sensor is employed to provide a signal when there is a train in proximity of the lighting fixture 100.

Optionally, the lighting fixture 100 comprises a wireless network module such as, for example, a cellular modem, for wireless data transmission of, for example, a camera video stream from a camera mounted to the lighting fixture 100 or other sensor data such as data from a contact sensor disposed in the railway switch for providing live sampled switch indications to the control system of the railroad. The solar panel 106 and the battery are then adapted to be capable to also power the wireless network module, the camera and/or other sensors.

The pole might further include a handle, or a powered winch apparatus or the like, to permit simplified raising and lowered of the pole through its pivotal range of movement. Embodiments with or without such a handle or winch apparatus are all contemplated within the scope hereof.

It will be apparent to those of skill in the art that by routine modification one or more embodiments can be optimized for use in a wide range of conditions and application. It will also be obvious to those of skill in the art that there are various ways and designs with which to produce the apparatus and methods of the present disclosure. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps not expressly referenced.

The invention claimed is:

1. An off-grid location lighting fixture comprising:
a base;
a pole mounted to the base through a first rim in the base at a bottom end portion thereof such that the pole is pivotally movable about the first pin between a first position with the pole being oriented substantially horizontal and a second position with the pole being oriented substantially vertical;
wherein the pole is secured in the second position by a second pin in the base at a top end portion thereof, the second pin being removable such that the pole is movable from the second position to the first position;
a solar panel, the solar panel being mounted to the pole at a top end portion thereof;
an LED light, the LED light being mounted to the pole and adapted to illuminate an area on ground adjacent to the lighting fixture in a direction of the pivotal axis;
a battery connected to the solar panel and the LED light, the battery configured to store electrical energy received from the solar panel and provide the same to the LED light;
control circuitry connected to the solar panel, the LED light, and the battery, the control circuitry configured to control storage of the electrical energy and provision of the same to the LED light;
a wireless network module electronically connected to the battery and the control circuitry; and
a sensor electrically connected to the battery and the control circuitry;
wherein the sensor is configured to operably couple to a railroad switch and send up electrical signal to the control circuitry indicating switch indications;
wherein the control circuitry is configured to communicate the switch indications to the wireless network machine; and
wherein the wireless network module is configured to communicate wirelessly the switch indications to a control system.

2. The lighting fixture according to claim 1, comprising at least an electrical box for containing the control circuitry and the battery therein.

3. The lighting fixture according to claim 2, wherein the at least an electrical box is mounted to the base.

4. The lighting fixture according to claim 1, comprising at least an electrical box for containing the control circuitry and the battery therein.

5. The lighting fixture according to claim 4, wherein the at least an electrical box is mounted to the base.

6. The lighting fixture according to claim 1, comprising an arm interposed between the LED light and the pole.

7. The lighting fixture according to claim 1, wherein the base is mounted to a screw pile.

8. The lighting fixture according to claim 1, wherein the pole further comprises a handle to assist an operator to complete the pivotal movement of the pole between the first position and the second position.

9. The lighting fixture according to claim 1, wherein the pole further comprises a powered winch apparatus to assist an operator to complete the pivotal movement of the pole between the first position and the second position.

10. An off-grid location lighting fixture comprising:
a base;
the base having an elongated u shaped channel extending from an upper end to a lower end;
a pole;
the pole mounted to the base by a pivot pin that is coupled to the base within the u shaped chained at a lower end portion thereof such that the same is pivotally movable about a pivotal axis between a first position with the pole being oriented substantially horizontal and a second position with the pole being oriented substantially vertical within the u shaped channel;
a securing pin removably coupled to the base;
the securing pin configured to operably connect the pole with an upper end portion of the base to secure the pole in the second position;
a solar panel, the solar panel being mounted to the pole at a top end portion thereof;
an arm extending outward from the pole to a free end;
wherein the arm extends outward from the pole in a direction of the pivotal axis so the arm does not prevent the pole from being moved to the first position;
an LED light, the LED light being mounted to the free end of the arm and adapted to illuminate an area on ground adjacent to the lighting fixture;
a battery electrically connected to the solar panel and the LED light, the battery configured to store electrical energy received from the solar panel and provide the same to the LED light;
control circuitry connected to the solar panel, the LED light, and the battery, the control circuitry configured to control storage of the electrical energy and provision of the same to the LED light;
a wireless network module electrically connected to the battery and the control circuitry; and
a camera electrically connected to the battery and the control circuitry;
wherein the camera is configured to gather visual images and send an electrical signal to the control circuitry related to the visual images;
wherein the control circuitry is configured to communicate the visual images to the wireless network module; and
wherein the wireless network module is configured to communicate wirelessly the camera indications to a control system.

11. The off-grid location lighting fixture of claim 10, further comprising a screw pile wherein the base is mounted to the top of the screw pile.

12. The off-grid location lighting fixture of claim 10, wherein the solar panel is rotatable to facilitate orientation of the solar panel for capture of sunlight.

13. The off-grid location lighting fixture of claim 10, wherein the pole has a length that is greater than or equal to 20 ft;
wherein the base has a length that is greater than or equal to 4 ft.

14. The off-grid location lighting fixture of claim 10, wherein the lighting fixture is configured to be used without any external electrical service connections.

15. The lighting fixture according to claim 10, wherein the pole further comprises a handle to assist an operator to complete the pivotal movement of the pole between raised and lowered positions.

16. The lighting fixture according to claim 10, wherein the pole further comprises a powered winch apparatus to assist an operator to complete the pivotal movement of the pole between raised and lowered positions.

* * * * *